(12) United States Patent
Kim

(10) Patent No.: US 10,551,404 B2
(45) Date of Patent: Feb. 4, 2020

(54) PITOT TUBE HAVING INTERIOR INCLINED SURFACE

(71) Applicant: Korea Aerospace Research Institute, Yuseong-gu, Daejeon (KR)

(72) Inventor: Sung Yug Kim, Seo-gu Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 0 days.

(21) Appl. No.: 16/060,376

(22) PCT Filed: Nov. 22, 2016

(86) PCT No.: PCT/KR2016/013455
§ 371 (c)(1),
(2) Date: Jun. 7, 2018

(87) PCT Pub. No.: WO2017/099391
PCT Pub. Date: Jun. 15, 2017

(65) Prior Publication Data
US 2019/0018036 A1 Jan. 17, 2019

(30) Foreign Application Priority Data
Dec. 9, 2015 (KR) .......... 10-2015-0174732

(51) Int. Cl.
*G01P 5/16* (2006.01)
*B64D 15/12* (2006.01)
*G01P 5/165* (2006.01)

(52) U.S. Cl.
CPC .............. *G01P 5/165* (2013.01); *B64D 15/12* (2013.01)

(58) Field of Classification Search
CPC ................................ G01P 5/165; B64D 15/12
See application file for complete search history.

(56) References Cited

U.S. PATENT DOCUMENTS 2,283,045 A * 5/1942 Carbonara .............. G01P 5/165
73/861.68
9,207,253 B2 * 12/2015 Seidel ....................... G01F 1/46
(Continued)

FOREIGN PATENT DOCUMENTS

JP         2001508870 A    7/2001
KR    1020060016557 A     2/2006
KR    1020120077056 A     7/2012

OTHER PUBLICATIONS

International Search Report dated Feb. 22, 2017, in International Patent Application No. PCT/KR2016/013455, filed on Nov. 22, 2016.

*Primary Examiner* — Jewel V Dowtin
(74) *Attorney, Agent, or Firm* — Downs Rachlin Martin PLLC

(57) ABSTRACT

A pitot tube having an inclined surface according to one embodiment may comprise: a housing which forms the outer appearance of the pitot tube; an opening which is arranged on the front side of the housing to allow a fluid to be injected thereinto; a first flow path which is connected to the opening; a slit which is arranged on the side of the housing to allow the fluid to be introduced thereinto; a second flow path which is connected to the slit; and a heater for heating frozen ice introduced into the opening and the slit to liquefy the ice, wherein the first flow path may be located above the center of the opening. Further, an inclined surface may be provided between the first flow path and the opening such that the liquefied fluid collides with the inclined surface after passing through the opening.

11 Claims, 3 Drawing Sheets

(56) References Cited

U.S. PATENT DOCUMENTS

| | | | |
|---|---|---|---|
| 9,696,187 B2* | 7/2017 | Whalen | G01F 1/34 |
| 9,726,688 B2* | 8/2017 | Dermer | H05B 3/0038 |
| 9,856,027 B2* | 1/2018 | Anderson | B64D 15/12 |
| 2004/0093953 A1 | 5/2004 | Gilkison et al. | |
| 2014/0053644 A1 | 2/2014 | Anderson et al. | |

* cited by examiner

100

100

PITOT TUBE HAVING INTERIOR INCLINED SURFACE

TECHNICAL FIELD

A pitot tube having an inner inclined surface is disclosed. More particularly, a pitot tube that measures a pressure and calculates a speed, wherein, to continuously measure a pressure applied to an aircraft travelling at a low speed, the pitot tube includes a heater at a rear of an inclined surface such that a fluid liquified by the heater is discharged along the inclined surface by the gravity is disclosed.

BACKGROUND ART

A pitot tube is a measuring sensor that measures a flow rate of a fluid and was named to commemorate the inventor, Henri Pitot. A concept of the pitot tube is disclosed in Korean Patent Laid-Open Publication No. 2006-16557 entitled as PITOT TUBE AND FLOW VELOCITY MEASUREMENT METHOD AND SYSTEM USING IT.

In general, a variety of information is required for an aircraft to operate. Among these information, static pressure and total pressure measurement information may be an important factor in calculating flight speed and altitude. Using the pitot tube on an aircraft may be the easiest way to measure static and total pressures on the aircraft. In the aircraft, the pitot tube may calculate a speed by converting a difference between the total pressure and the static pressure. In this example, to increase accuracy on measurement, the pitot tube may be disposed in a place on an outer side of a boundary layer of the aircraft where less flow scattering occurs.

DISCLOSURE OF INVENTION

Technical Goals

An aspect provides a pitot tube that is continuously available during flight of an aircraft.

Another aspect provides a pitot tube that reduces energy consumption to increase efficiency.

Still another aspect provides reduce a weight of a pitot tube to reduce a weight of a moving body such as an electric airplane and a small aircraft which is difficult to mount a large-capacity heater.

Yet another aspect provides a pitot tube for accurately detecting a pressure with a simplified structure, the pitot tube which is configured to discharge a liquified fluid at a front side instead of having a separate drain hole for discharging the liquified fluid on a housing of the pitot tube.

Further another aspect provides a pitot tube that is manufactured at a low cost, thereby improving an economical efficiency.

Technical Solutions

According to an aspect, there is provided a pitot tube including a housing configured to form an outer appearance, an opening formed on a front side of the housing to allow a fluid to be introduced thereinto, a first flow path connected to the opening, and a heater configured to apply a heat to an ice formed when the fluid is introduced into the opening to liquify the ice, wherein the first flow path is located above a center of the opening.

An inclined surface may be formed between the first flow path and the opening and the heater may be disposed rearward of the inclined surface to liquify an ice formed when the fluid is introduced through the inclined surface. A liquified fluid may be discharged to the opening through the inclined surface.

The pitot tube may further include a slit formed on a side surface of the housing to allow a fluid to be introduced thereinto and a second flow path connected to the slit, wherein the heater may be configured to apply a heat to an ice formed when the fluid is introduced into the slit to liquify the ice.

The first flow path may include a dynamic pressure measurer and the second flow path may include a pressure measurer configured to measure a static pressure. The pressure measurer may be provided in a fuselage of an aircraft selectively.

A plurality of slits may be radially arranged on the side surface of the housing.

According to another aspect, there is also provided a pitot tube including a housing configured to form an outer appearance, an opening formed on a front side of the housing to allow a fluid to be introduced thereinto, and a flow path connected to the opening with a step difference, a pressure measurer disposed rearward of the flow path to measure a pressure exerted by the fluid introduced through the flow path, wherein the pitot tube is configured to measure a pressure of the fluid and discharge a liquified fluid on a side of the opening to an outside of the opening.

An inclined surface may be provided between the first flow path and the opening such that a liquified fluid is discharged to an outside through the inclined surface and the opening.

The pitot tube may further include a slit formed on a side surface of the housing to allow air to be introduced thereinto and another flow path connected to the slit and including a pressure measurer configured to measure a pressure.

A length of the step difference may be greater than a half of a length of the opening.

The pitot tube may further include a heater configured to apply a heat to an ice formed when the fluid is introduced into the pitot tube to liquify the ice.

Effects

According to an aspect, it is possible to provide a pitot tube using a heater to prevent freezing so as to be continuously used during flight.

According to another aspect, it is possible to provide a pitot tube configured to discharge a liquified fluid using an inclined surface and the gravity instead of having a drain hole. As such, because an internal flow path for discharging a fluid is not required, the pitot tube may liquify the fluid using a small-capacity heater, which may reduce energy consumption and increase an energy efficiency.

According to still another aspect, it is possible to provide a pitot tube using a small-capacity heater of which a weight is relatively small, thereby reducing a weight of the pitot tube.

According to yet another aspect, it is possible to provide a pitot tube from which an internal pressure changing factor, for example, a drain hole to collect reliable pressure measurement information without additional correction.

According to further another aspect, it is possible to provide a pitot tube using a small-capacity heater to reduce a manufacturing cost.

BRIEF DESCRIPTION OF DRAWINGS

FIGS. 3A through 3B illustrate a process of discharging a fluid liquified in a pitot tube according to an example embodiment, wherein FIG. 3A illustrates a fluid introduced through an opening and a slit of the pitot tube, FIG. 3B illustrates a heater discharging a heat.

BEST MODE FOR CARRYING OUT THE INVENTION

Figure 1:
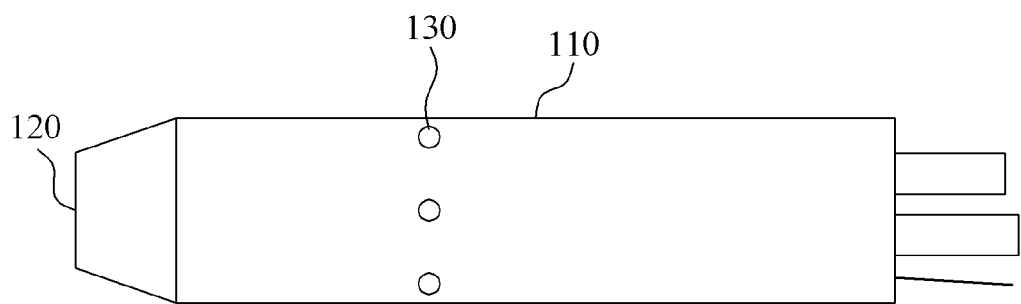
FIG. 1 is a perspective view illustrating a pitot tube according to an example embodiment.

Hereinafter, example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

Figure 2:
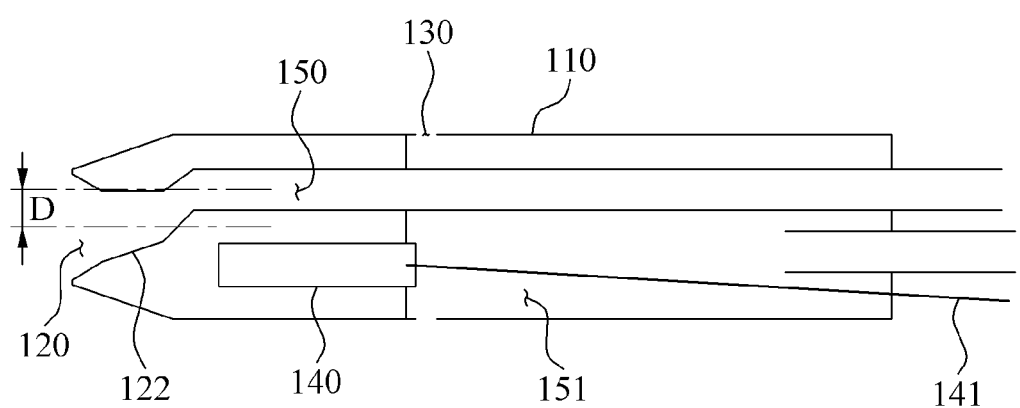
FIG. 2 is a cross-sectional view illustrating a pitot tube according to an example embodiment.

FIG. 1 is a perspective view illustrating a pitot tube 100 according to an example embodiment and FIG. 2 is a cross-sectional view illustrating the pitot tube 100 according to an example embodiment. Referring to FIGS. 1 and 2, the pitot tube 100 may include a housing 110, an opening 120, an inclined surface 122, a slit 130, a heater 140, a heater cable 141, a first flow path 150, and a second flow path 151.

The housing 110 may include the opening 120 and the slit 141 and configured to form an outer appearance of the pitot tube 100.

Although the present example and the drawings describe and illustrate the housing in a cylindrical shape, a shape of the housing is not limited thereto. The housing may be formed in various shapes, for example, an oval shape and a wing-type shape. Also, the first flow path 150, the second flow path 151, and the heater cable 141, which are illustrated as protrusions in the drawing, may also be provided inside the housing 110.

The opening 120 may be formed on a front side of the housing 110, for example, in a travelling direction of a fuselage of an aircraft. A fluid Fa of which a flow is generated by the fuselage of the aircraft travelling may be introduced into the pitot tube 100 through the opening 120 on the front side of the housing 110. In this example, the flow of the fluid introduced due to the travelling of the aircraft may include a dynamic pressure generated due to a movement of the fuselage of the aircraft and a static pressure that is a pressure around the fuselage of the aircraft. The fluid Fa may be introduced into the first flow path 150 through the opening 120 and the inclined surface 122.

The first flow path 150 may include a pressure measurer. Here, the pressure measurer may be a sensor that directly measures a pressure. Also, the pressure measurer may be a pipe through which a pressure or a pressure signal is transmitted into the fuselage of the aircraft so as to measure the pressure of the pressure signal. The first flow path 150 may close an end portion such that the fluid Fa remains therein.

A step difference D may be a difference in height between a longitudinal axis of the pitot tube 100 and a longitudinal axis of the first flow path 150 may be formed to be greater than a half of a length of the opening 120. For example, when the pitot tube 100 is viewed frontally, the first flow path 150 may be obscured by the inclined surface 122 due to the step difference D. In this example, on a two-dimensional (2D) plane, the opening 120 and a circumference of the first flow path 150 may be circumscribed or separated.

The drawing illustrates that the first flow path 150 of the pitot tube 100 is parallel to an axis of the pitot tube 100 and provided in a straight-line shape but not limited thereto. The first flow path 150 may be provided in, for example, a curved shape and a grid shape.

The slit 130 may be formed on a side surface of the housing 110. At the side surface of the housing 110, the fluid Fa may be introduced or discharged through the slit 130 by the static pressure that is the pressure around the fuselage of the aircraft. The fluid Fa may be introduced into the second flow path 151 through the slit 130. A plurality of slits including the slit 130 may be radially formed on the side surface of the housing 110.

The second flow path 151 may include a pressure measurer similar to the first flow path. Here, the pressure measurer may be a sensor that directly measures a pressure. Also, the pressure measurer may be a pipe through which a pressure or a pressure signal is transmitted into the fuselage of the aircraft so as to measure the pressure of the pressure signal. The second flow path 151 may close an end portion such that the fluid Fa remains therein.

The pitot tube 100 may include the heater 140 that applies a heat to ices formed when the fluid Fa and a fluid fa are introduced through the opening 120 and the slit 130, so as to liquify the ice. When the low-temperature fluid Fa or fa containing a large amount of water such as clouds is in contact with the pitot tube 100, the opening 120 and the slit 130 may be closed due to the fluid being frozen, which may cause a functional problem of the pitot tube 100. To prevent this, the heater 140 may apply the heat to an ice formed by the frozen fluid to liquify the ice.

To increase a thermal efficiency, the heater 140 may be disposed rearward of the inclined surface 122 in the pitot tube 100. Specifically, the pitot tube 100 may liquify the ice at the front side and thus, require the heat for liquefaction. In this instance, because the thermal efficiency may be reduced as a distance between the heater 140 and the front side increases, the heater 140 may be disposed as close as possible to the inclined surface 122 to increase the thermal efficiency.

The heater 140 may be disposed rearward of the inclined surface 122 such that the inclined surface 122 liquefies the ice formed by the fluid Fa introduced from the front side. Specifically, the fluid Fa or fa may be low-pressure air containing water, wherein a pressure of may increase and the water may be pressed and liquified when the heat is applied. As such, water of a liquified fluid Ff may be discharged to an outside through the inclined surface 122.

Although the present example illustrates the pitot tube 100 discharging the fluid Ff through the inclined surface 122, embodiments are not limited thereto. For example, the pitot tube 100 may include an additional flow path through which the liquified fluid Ff flows.

For example, the pitot tube 100 may include double flow paths. An inner flow path, for example, the first flow path 150 may have the opening 120 on a front portion and an outer flow path, for example, the second flow path 151 may have the slit 130 on a side surface. A pressure sensor may be provided each of the first flow path 150 and the second flow path 151 to measure a difference between pressures applied to the first flow path and the second flow path.

The slit 130 of the second flow path 151 of the pitot tube 100 may be formed on the side surface. Thus, the slit 130 may not be affected by the flow and may receive the static pressure around the fuselage of the aircraft. Also, the opening 120 of the first flow path 150 may be formed on the front side to correspond to a travelling direction of the fuselage of the aircraft. Through the opening 120 formed on the front side, a total pressure obtained by combining the static pressure around the fuselage of the aircraft and the dynamic pressure generated due to the movement of the fuselage of the aircraft may be received. A difference between the received pressures may be a dynamic pressure. A calculated dynamic pressure may be used to measure a speed of the fuselage of the aircraft.

Also, the pitot tube 100 may not include the slit 130 for measuring the static pressure. In this example, the static pressure may be measured by other element, for example, a static pressure pipe of the aircraft.

Hereinafter, a method of using the pitot tube 100 will be described with reference to FIGS. 3A through 3D.

Figure 3A:
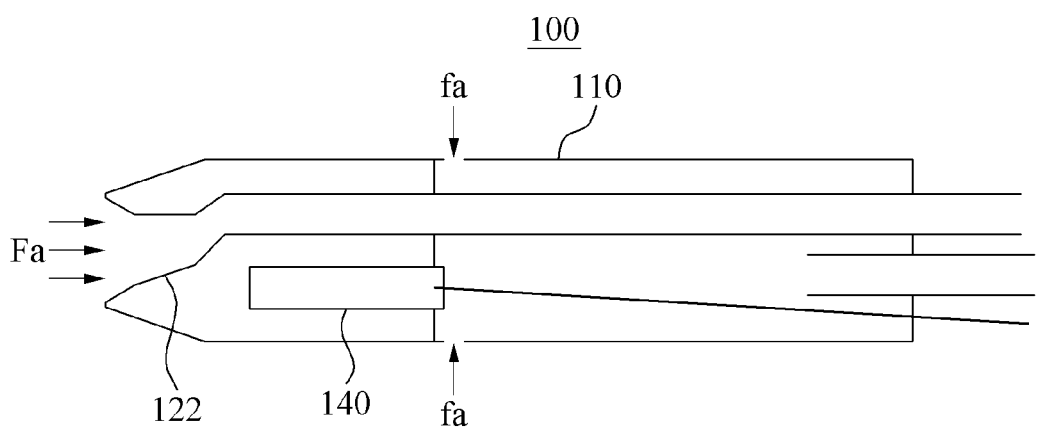

FIG. 3A illustrates an example of a flow applied to the pitot tube 100. Referring to FIG. 3A, the fluid Fa may be introduced into the first flow path 150 of the pitot tube 100 through the opening 120 formed on a front side of the housing 110 of the pitot tube 100. In this example, the fluid Fa may flow into the first flow path 150 after colliding with the inclined surface 122. Also, the fluid Fa may flow into the second flow path 151 of the pitot tube 100 through the slit 130 formed on the side surface of the pitot tube 100.

For example, through the opening 120 connected to the inclined surface 122, a pressure and an atmospheric pressure due to a flow of air resulting from the flight of the aircraft may be provided to the first flow path 150. Also, an inside of the second flow path connected to the slit 130 may be controlled to be at the same pressure as an atmospheric pressure applied to an altitude at which the aircraft flies.

Figure 3B:
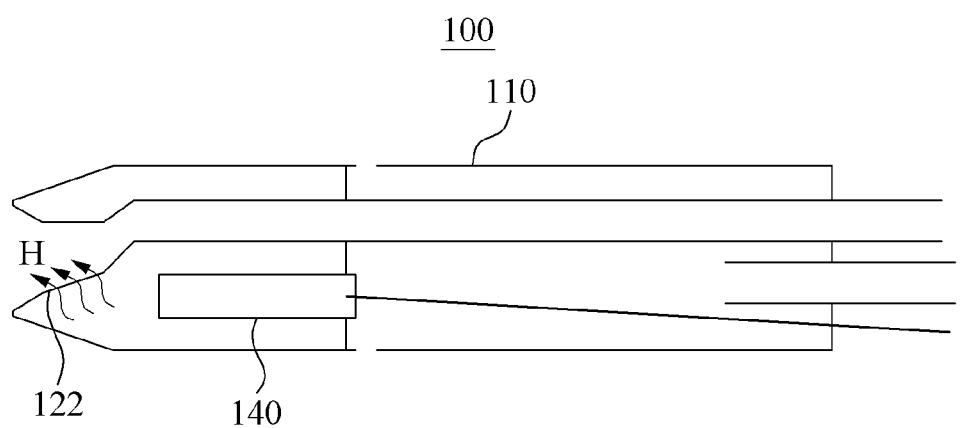

FIG. 3B illustrates a heat H discharged through the inclined surface 122 of the pitot tube 100. Referring to FIG. 3B, the inclined surface 122 may receive the heat H through the heater 140 having received energy through the heater cable 141. The heat H may be discharged through the inclined surface and applied to the fluid Fa.

For example, when low-pressure and low-temperature air is introduced into the pitot tube 100 based on the altitude while the fuselage of the aircraft travels, the heater 140 may apply a heat to the inclined surface 122.

Figure 3C:
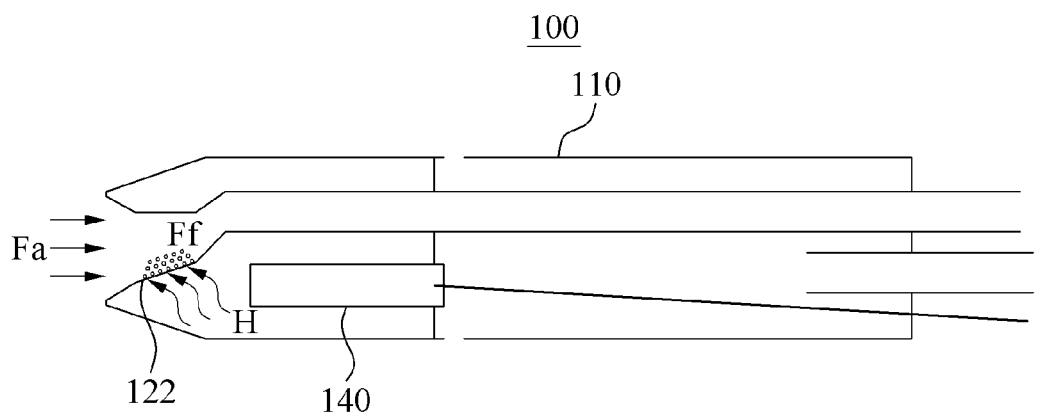
FIG. 3C illustrates liquefaction of an ice formed when the fluid is introduced into the opening.

FIG. 3C illustrates an example of a state in which water of the fluid Fa liquified on the inclined surface 122 of the pitot tube 100. Referring to FIG. 3C, the fluid Fa may be heated by a heat of the inclined surface 122, so that the water of the fluid Fa is liquified. Also, the liquified fluid Ff may be condensed on the inclined surface 122.

As illustrated in FIG. 3B, when air, for example, air containing water or clouds is in contact with a heated inclined surface, a temperature of the air may increase. In response to the temperature increasing, the air may be liquified on the inclined surface 122, and then liquified water may be condensed.

Figure 3D:
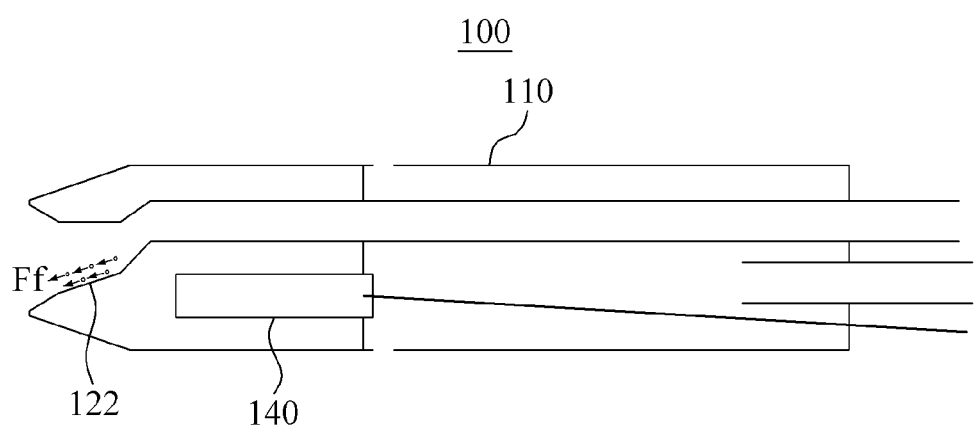
FIG. 3D illustrates a process of discharging the liquified ice.

FIG. 3D illustrates an example in which the fluid Ff condensed on the inclined surface 122 of the pitot tube 100 is discharged. Referring to FIG. 3D, the liquified and condensed fluid Ff may be discharged to an outside through the inclined surface 122 by the gravity.

For example, the water of the air liquified on the inclined surface 122 may be discharged to an outside of a pitot tube by the gravity.

As such, the pitot tube 100 may liquify the fluid using the heater 140 having a small capacity with a reduced weight and an increased energy efficiency, and connect and use pressure measurement information without additional correction.

Although a few embodiments have been shown and described, the described embodiments are not limited thereto. Instead, it would be appreciated by those skilled in the art that changes may be made to these embodiments without departing from the principles and spirit of the invention, the scope of which is defined by the claims and their equivalents.

The invention claimed is:

1. A pitot tube comprising:
   a housing configured to form an outer appearance;
   an opening formed on a front side of the housing to allow a fluid to be introduced thereinto;
   a first flow path connected to the opening; and
   a heater configured to apply a heat to an ice formed when the fluid is introduced into the opening to liquify the ice,
   wherein the first flow path is located above a center of the opening.

2. The pitot tube of claim 1, wherein an inclined surface is formed between the first flow path and the opening such that a liquified fluid passing through the opening collides with the inclined surface as it travels to the first flow path.

3. The pitot tube of claim 2, wherein the heater is disposed rearward of the inclined surface to liquify an ice formed when the fluid is introduced proximate the inclined surface such that a liquified fluid collides with the inclined surface.

4. The pitot tube of claim 1, further comprising:
   a slit formed on a side surface of the housing to allow a fluid to be introduced thereinto; and
   a second flow path connected to the slit,
   wherein the heater is configured to apply a heat to an ice formed when the fluid is introduced into the slit to liquify the ice.

5. The pitot tube of claim 4, wherein a pressure measurer is provided in the first flow path or the second flow path,
   the pressure measurer is configured to measure a total pressure including a dynamic pressure and a static pressure in the first flow path, and
   the pressure measurer is configured to measure a static pressure in the second flow path.

6. The pitot tube of claim 4, wherein a plurality of slits is radially arranged on the side surface of the housing.

7. A pitot tube comprising:
   a housing configured to form an outer appearance;
   an opening formed on a front side of the housing to allow a fluid to be introduced thereinto;
   a flow path connected to the opening with a step difference; and
   a pressure measurer disposed rearward of the flow path to measure a pressure exerted by the fluid introduced through the flow path, wherein the pitot tube is configured to measure a pressure of the fluid and to discharge a liquified fluid on a side of the opening.

8. The pitot tube of claim 7, wherein an inclined surface is provided between the flow path and the opening such that a liquified fluid is discharged to the opening through the inclined surface.

9. The pitot tube of claim 7, further comprising:
a slit formed on a side surface of the housing to allow air to be introduced thereinto; and
another flow path connected to the slit and comprising a pressure measurer configured to measure a pressure.

10. The pitot tube of claim 7, wherein a length of the step difference is greater than a half of a length of the opening.

11. The pitot tube of claim 7, further comprising:
a heater configured to apply a heat to an ice formed when the fluid is introduced into the pitot tube to liquify the ice.

\* \* \* \* \*